US006271288B1

(12) United States Patent
Yamaguchi et al.

(10) Patent No.: US 6,271,288 B1
(45) Date of Patent: Aug. 7, 2001

(54) POLYOLEFIN RESIN COMPOSITION FOR EXTRUSION MOLDING AND RAW MATERIAL COMPOSITION THEREFOR

(75) Inventors: Yuki Yamaguchi; Yutaka Matsumoto, both of Marugame; Minoru Ueda, Kagawa-ken; Hideaki Matsuda, Marugame, all of (JP)

(73) Assignee: Okura Industrial Co., Ltd. (JP)

( * ) Notice: Subject to any disclaimer, the term of this patent is extended or adjusted under 35 U.S.C. 154(b) by 0 days.

(21) Appl. No.: 09/302,426

(22) Filed: Apr. 30, 1999

(30) Foreign Application Priority Data

Sep. 18, 1998 (JP) .................................................. 10-264191

(51) Int. Cl.$^7$ ................................ C08J 5/10; C08L 1/10; C08L 1/20
(52) U.S. Cl. ............................. 524/37; 524/38; 525/192; 525/193; 525/194
(58) Field of Search ........................ 524/37, 38; 525/192, 525/193, 194

(56) References Cited

U.S. PATENT DOCUMENTS 5,759,680 * 6/1998 Brooks et al. ........................ 428/326

FOREIGN PATENT DOCUMENTS

9316248 * 12/1997 (JP) .
9-316248 12/1997 (JP) .

* cited by examiner

Primary Examiner—James J. Seidleck
Assistant Examiner—U. K. Rajguru
(74) Attorney, Agent, or Firm—Lorusso & Loud

(57) ABSTRACT

A raw material composition for an extrusion moldable polyolefin resin composition including (a) a polypropylene resin, (b) a polyethylene resin, (c) an esterified cellulose material obtained by esterifying a cellulose material with a polybasic acid anhydride and having a content of the polybasic acid anhydride bonded thereto of 0.5–20% based on the weight of the cellulose material, and (d) an organic peroxide compound, wherein the weight ratio of (a) to (b) ranges from 30:70 to 80:20, wherein the weight ratio of a total of (a)+(b) to (c) ranges from 30:70 to 70:30, and wherein (d) is present in an amount of 0.001 to 0.1% based on a total weight of (a)+(b)+(c). By kneading the raw material composition at 150–200° C. for 0.5 to 30 minutes, a polyolefin composition for extrusion molding is obtained.

14 Claims, No Drawings

POLYOLEFIN RESIN COMPOSITION FOR EXTRUSION MOLDING AND RAW MATERIAL COMPOSITION THEREFOR

BACKGROUND OF THE INVENTION

This invention relates to a polyolefin resin composition containing an esterified cellulose material and useful for forming a shaped article, especially, an odd-shaped article, by extrusion. The present invention is also directed to a raw material composition for the above polyolefin resin composition.

Because of cheapness, woody materials such as wood meal have been mixed with a thermoplastic resin for the production of molded plates or tubes. In such a technique, fluidity of the mixture is the most important concern. Thus, a lot of proposals have been made to improve the fluidity of a thermoplastic resin composition containing a woody material. Such a composition, however, is usable only for the production of shaped articles having a simple contour, such as rods, but is ill-suited for the production of odd-shaped articles, namely articles having a relatively complicated contour, such as L-shaped plates, because of poor melt tension thereof.

JP-A-H9-316248 discloses a composition containing a polyolefin resin, an esterified cellulose or lignocellulose and an organic peroxide compound. JP-A-H9-316248 teaches that a polypropylene resin used as the polyolefin resin decomposes by reaction with the organic peroxide compound during kneading to cause reduction of the molecular weight thereof. As a result, the melt tension of the kneaded composition is lowered. JP-A-H9-316248 thus proposes to incorporate a liquid cross-linking agent or a low melting point cross-linking agent to prevent the reduction of the molecular weight of the polymer and to improve the melt tension of the kneaded composition.

SUMMARY OF THE INVENTION

It has now been found that the use of a liquid cross-linking agent or a low melting point cross-linking agent causes problems not only because the production costs increase but also because the cross-linking agent is not compatible with a polyolefin resin.

It is, therefore, an object of the present invention to provide an inexpensive polyolefin resin composition containing a woody material suitable for the production of an odd-shaped article by extrusion.

Another object of the present invention is to provide a polyolefin resin composition of the above-mentioned type which has a high melt tension and good shape retentivity when extruded through a die.

It is a further object of the present invention to provide a raw material composition for the above polyolefin resin composition, which does not contain a cross-linking agent and which is devoid of the drawbacks of the above-described known composition.

In accomplishing the foregoing objects, there is provided in accordance with the present invention a polyolefin resin composition obtained by kneading a raw material composition containing a polypropylene resin, a polyethylene resin, an esterified woody material and an organic peroxide compound, wherein the weight ratio of the polypropylene resin to the polyethylene resin ranges from 30:70 to 80:20.

The esterified woody material may be an esterified cellulose material obtained by esterifying a cellulose material with a polybasic acid anhydride and having a content of the polybasic acid anhydride bonded thereto of 0.5–20% based on the weight of the cellulose material. The weight ratio of a total of the polypropylene resin and polyethylene resin to the cellulose material ranges from 30:70 to 70:30. The organic peroxide compound is used in an amount of 0.001 to 0.1% based on a total weight of the polypropylene resin, polyethylene resin and cellulose material. The cellulose material may be selected from cellulose, modified cellulose, lignocellulose and modified lignocellulose.

The polyolefin resin composition is obtained by kneading the above raw material composition at 150–200° C. for 0.5 to 30 minutes. Though not wishing to be bound by the theory, it is considered that, during the kneading, the organic peroxide is decomposed with the simultaneous breakage of main chains of the polyolefin resins and the formation of cross-linkages. The kneaded composition, namely the polyolefin resin composition, may be pelletized. Thus, in one preferred embodiment, the polyolefin resin composition according to the present invention is in the form of pellets which are ready for use in extrusion molding for the formation of molded articles having any desired shape or contour.

Other objects, features and advantages of the present invention will become apparent from the detailed description of the preferred embodiments of the invention to follow.

DETAILED DESCRIPTION OF THE PREFERRED EMBODIMENTS OF THE INVENTION

The raw material composition for the polyolefin resin composition according to the present invention contains the following ingredients (a)–(d):

(a) a polypropylene resin;
(b) a polyethylene resin;
(c) an esterified cellulose material; and
(d) an organic peroxide compound.

As the polypropylene resin (a), a polypropylene homopolymer or a propylene copolymer such as a propylene-α-olefin random or block copolymer may be used. The propylene copolymer preferably contains at least 50 molar % of propylene. Illustrative of α-olefins are ethylene, 1-butene, 1-pentene, 1-hexene, 4-methyl-1-pentene and 1-octene. The above polypropylene resins may be used in combination of two or more thereof. The use of a propylene homopolymer or a propylene-ethylene block copolymer is particularly preferred for the purpose of the present invention.

The polypropylene resin (a) preferably has a melt flow rate (MFR in accordance with ASTM D1238) of 0.1 to 10 g/10 minutes, more preferably 0.5–5 g/10 minutes, at a temperature of 230° C. and a load of 2.16 kg and a melt tension of at least 5 g at 190° C.

As the polyethylene resin (b), a polyethylene homopolymer such as a low density polyethylene or a high density polyethylene or an ethylene copolymer such as an ethylene-α-olefin copolymer may be used. The ethylene copolymer preferably contains more than 50 molar % of ethylene. Illustrative of α-olefins are 1-butene, 1-pentene, 1-hexene, 4-methyl-1-pentene and 1-octene. The use of a high density polyethylene is particularly preferred for the purpose of the present invention.

The polyethylene resin (b) preferably has a melt flow rate of 0.01 to 1.0 g/10 minutes, more preferably 0.01–0.5 g/10 minutes, most preferably 0.01–0.3 g/10 minutes, at a temperature of 190° C. and a load of 2.16 kg and a melt tension of at least 15 g at 190° C.

The weight ratio of the above ingredient (a) to ingredient (b) ranges from 30:70 to 80:20, preferably 40:60 to 70:30. A weight ratio (a) to (b) above 80:20 causes chain degradation of the polypropylene resin (a) so that the melt tension of the polyolefin resin composition decreases and, hence, it is difficult to prepare an odd-shaped molded article by extrusion. On the other hand, too small a weight ratio (a) to (b) below 30:70 causes the formation of excessive cross-linking so that a high load should be applied to an extruder and, hence, it is difficult to smoothly perform extrusion of the polyolefin resin composition.

The esterified cellulose material (c) is obtained by esterifying a cellulose material with a polybasic acid anhydride and has a content of the polybasic acid anhydride bonded thereto of 0.5–20%, preferably 1–10%, based on the weight of the cellulose material.

The cellulose material may be selected from cellulose, modified cellulose, lignocellulose and modified lignocellulose. Any cellulose, lignocellulose or derivatives thereof customarily used as a filler for a resin composition may be suitably used for the purpose of the present invention. Illustrative of suitable cellulose materials are wood meal and wood fiber.

The polybasic acid anhydride to be used for the esterification of the cellulose material may be, for example, maleic anhydride, phthalic anhydride, succinic anhydride, tetrahydrophthalic anhydride, itaconic anhydride and adipic anhydride. Above all, the use of maleic anhydride, phthalic anhydride or succinic anhydride is preferred for reasons of their availability at low costs. The above polybasic acid anhydrides may be used in combination of two or more thereof.

It is preferred that the polybasic acid anhydride have a polymerizable double bond. Namely, when the cellulose material is esterified with a polybasic acid anhydride having a polymerizable double bond, such as maleic anhydride or itaconic anhydride, the esterified cellulose material (c) can contribute to the formation of cross-linkages and chemical bonds between the ingredient (c) and the ingredients (a) and (b), when the raw material composition containing ingredients (a)–(d) is kneaded. The formation of such chemical bonds can also improve the compatibility between the ingredient (c) and the ingredients (a) and (b). Accordingly, the use of maleic anhydride as the polybasic acid anhydride is most preferred.

The esterification of the cellulose material with the polybasic acid anhydride may be carried out in any suitable conventional manner.

The weight ratio of a total of the ingredients (a) and (b) to the ingredient (c) ranges from 30:70 to 70:30, preferably 40:60 to 70:30. A weight ratio of ((a)+(b))/(c) of below 30:70 is undesirable because it is difficult to perform extrusion molding of the polyolefin resin composition. When the weight ratio of ((a)+(b))/(c) exceeds 70:30, the effect attributed to the ingredient (c) is not sufficiently obtained.

Any organic peroxide compound may be used as the ingredient (d) as long as it has a —O—O— linkage. Thus, an organic peroxide such as a dialkyl peroxide, a diacyl peroxide, hydro peroxide, or a ketone peroxide; an organic perester such as an alkyl perester; or peroxydicarbonate may be suitably used as the ingredient (d). Illustrative of suitable organic peroxide compounds are benzoyl peroxide, dichlorobenzoyl peroxide, dicumyl peroxide, di-t-butyl peroxide, 2,5-dimethyl-2,5-di(peroxybenzoate)hexyn-3,1,3-bis(t-butylperoxy-isopropyl)benzene, lauroyl peroxide, t-butyl peracetate, 2,5-dimethyl-2,5-di(t-butylperoxy)hexyn-3,2,5-dimethyl-2,5-di(t-butylperoxy)hexane, t-butyl peroxybenzoate, t-butyl peroxyphenyl acetate, t-butyl peroxyisobutylate, t-butyl peroxy-sec-octate, t-butyl peroxypivalate, cumyl peroxypivalate and t-butyl peroxydiethylacetate. Above all, the use of t-butyl peroxybenzoate, 1,3-bis(t-butylperoxy-isopropyl)benzene or 2,5-dimethyl-2,5-di(t-butylperoxy)hexane is preferred. The above peroxide compounds may be used singly or in combination of two or more thereof.

The peroxide compound (d) is used in an amount of 0.001 to 0.1%, preferably 0.005 to 0.05%, based on a total weight of the ingredients (a), (b) and (c). An amount of the peroxide compound (d) below 0.001% or above 0.1% cannot attain the objects of the present invention.

The raw material composition according to the present invention can contain a filler and various other additives as desired. The filler may be an inorganic filler such as talc, calcium carbonate, mica or a glass fiber or an organic filler such as a polyester fiber or a polyamide fiber. The additives may be, for example, a flame retardant, a stabilizing agent, a UV absorbing agent, an antioxidant, a plasticizer, a lubricant, a dye and a pigment.

The polyolefin resin composition is produced by kneading the above raw material composition at 150–200° C., preferably 160–190° C., for 0.5 to 30 minutes, preferably 1–20 minutes. The kneading may be carried out with any conventionally used device such as a blender, a kneader, a roll mixer, a Banbury mixer or a uniaxial or biaxial extruder. A kneading temperature above 200° C. is undesirable because the esterified woody material tends to be decomposed. The use of a biaxial extruder, which can control the kneading temperature, is thus recommendable. The kneaded composition as such may be extruded to any desired final extruded product. Alternatively, the kneaded composition may be temporarily shaped into pellets or particles for the purpose of storage.

The polyolefin resin composition according to the present invention thus prepared by kneading the raw material composition can exhibit a melt flow rate of 0.005 to 0.05 g/10 minutes at a temperature of 190° C. and a load of 2.16 kg and a melt tension of at least 10 g at 190° C. and, therefore, has good moldability and can afford odd-shaped articles having any desired contour. Further, because of improved compatibility between the polyolefin resin (ingredients (a) and (b)) and the esterified woody material (ingredient (c)), shaped articles obtained by extrusion molding of the polyolefin resin composition have excellent mechanical strengths such as tensile strength, bending strength and impact resistance.

The polyolefin resin composition according to the present invention may be used for the production of any extruded articles for use as, for example, electrically insulating materials, domestic electric appliances, industrial parts and construction and housing materials. Examples of shaped articles include baseboards, surface decorative boards, door materials, exterior wall materials, interior wall materials, counter materials, window frames, handrails, knobs, pillars, floor materials, earthquake-proofing materials, ceiling materials, concrete panels, backing materials, scaffolding materials, shielding materials, sound-proofing materials, furniture materials, shelves, cooking materials, water-proofing materials and flashing boards.

The following examples will further illustrate the present invention.

EXAMPLES 1–5 AND COMPARATIVE EXAMPLES 1–4

Ingredients shown in Table 1 were fed to a hopper of a biaxial extruder in amounts (parts by weight) shown in Table 1 and kneaded in the extruder to obtain a polyolefin resin composition. The kneading was carried out at a barrel temperature of 160° C., a screw revolution rate of 250 rpm and an extruder outlet temperature of 180–190° C. and with a residence time of 1 minute. The kneaded mass was extruded through a die of the extruder to obtain a polyolefin resin composition in the form of pellets.

TABLE 1

| Example No. | PP *1 | PE1 *2 | PE2 *3 | Woodmeal *4 | Peroxide *5 |
|---|---|---|---|---|---|
| Example 1 | 40 | 30 | — | 30 | 0.008 |
| Example 2 | 40 | 30 | — | 30 | 0.016 |
| Example 3 | 40 | — | 30 | 30 | 0.008 |
| Example 4 | 34 | 26 | — | 40 | 0.008 |
| Example 5 | 40 | 20 | — | 40 | 0.016 |
| Comp. Ex. 1 | 70 | — | — | 30 | 0.008 |
| Comp. Ex. 2 | — | 70 | — | 30 | 0.016 |
| Comp. Ex. 3 | 40 | 30 | — | 30 | — |
| Comp. Ex. 4 | 51 | 9 | — | 40 | 0.016 |

*1 Ingredient (a) homopolypropylene resin, MFR: 0.5 g/10 minutes melt tension: 28 g, specific gravity: 0.91
*2 Ingredient (b-1) high density polyethylene, MFR: 0.01 g/10 minutes (according to ASTM D1238, at 190° C., 2.16 load), melt tension: 32 g, specific gravity: 0.96
*3 Ingredient (b-2) high density polyethylene, MFR: 0.03 g/10 minutes (according to ASTM D1238, at 190° C., 2.16 load), melt tension: 20 g, specific gravity: 0.96
*4 Ingredient (c) esterified woodmeal obtained by esterifying woodmeal (LIGNOCEL C120 manufactured by Rettenmaier & Soeue. (Germany)) with maleic anhydride and having a maleic anhydride content of 2.4% by weight based on the woodmeal
*5 Ingredient (d) 1,3-bis(2-t-butylperoxyisopropyl)benzene Each of the polyolefin resin compositions obtained above was measured for MFR, melt tension, moldability and appearance of a molded body according to the methods described below. Before measurement, the pellets were dried at 120° C. for 4 hours to remove absorbed moisture. The results are summarized in Table 2.

MFR:

MFR is measured according to ASTM D1238, at 190° C., 2.16 kg load.

Melt Tension:

A tension detector is disposed just below a die such that a lower end of a V-pulley of the detector is spaced apart a distance of 40 cm from an outlet of the die. The die has a nozzle diameter of 2.095 mm and a nozzle length of 8 mm. A melt of the pellets is extruded through the die at 190° C. and an extrusion rate of 75 mm/minute with a flow angle of 180 degrees and is taken up about the V-pulley at a rate of 3.0 m/minute, while measuring a tension applied to the V-pulley.

Moldability:

Using a uniaxial extruder (LABOST MILL manufactured by Toyo Seiki Manufacturing Co., Ltd.) having a cylinder diameter of 25 mm, an L/D ratio of 25, a compression ratio of 2.3 and a strand die having a diameter of 5 mm, a melt of the pellets is extruded into a strand to evaluate moldability. Also evaluated is an appearance of the extruded strand by naked eyes. The moldability is evaluated according to the following rating:

A: Excellent

B: Good

C: Poor

TABLE 2

| Example No. | MFR (g/10 min) | Melt tension | Moldability | Appearance |
|---|---|---|---|---|
| Example 1 | 0.03 | 29 | A | good |
| Example 2 | 0.01 | 35 | A | good |
| Example 3 | 0.04 | 15 | A | good |
| Example 4 | 0.02 | 33 | A | good |
| Example 5 | 0.02 | 23 | A | good |
| Comp. Ex. 1 | 0.3 | <0.1 | A | draw down *8 |
| Comp. Ex. 2 | *6 | *7 | C | very rough *9 |
| Comp. Ex. 3 | 0.03 | 32 | B | rough *10 |
| Comp. Ex. 4 | 0.08 | 5 | A | draw down *8 |

*6 MFR is too low to measure.
*7 Melt tension is too high to measure.
*8 Strand fails to maintain its shape and is drawn down. Surface of the strand is rough.
*9 Surface of the strand has a number of protrusions and depressions.
*10 Surface of the strand is rough.

The compositions of Examples 1–5 had a melt flow rate of 0.005 to 0.05 g/10 minutes at a temperature of 190° C. and a load of 2.16 kg and a melt tension of at least. 10 g at 190° C., showed excellent moldability and gave shaped bodies having excellent appearance.

The compositions of Comparative Examples 1 and 4 containing no or a low polyethylene content had a high MFR and showed good moldability. However, because of a low melt tension, the compositions of Comparative Examples 1 and 4 failed to give shaped articles having a desired shape.

The composition of Comparative Example 2 containing no polypropylene resin had a too low MFR to be extruded.

The composition of Comparative Example 3 containing no peroxide had suitable MFR and melt tension but failed to show reduction of viscosity at a high shearing rate. As a consequence, the moldability was poor (a high load is required for extrusion). The shaped body had a rough surface.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A polyolefin resin composition for extrusion molding obtained by kneading a raw material composition which comprises:

(a) a polypropylene resin;

(b) a polyethylene resin;

(c) an esterified cellulose material obtained by esterifying a cellulose material with a polybasic acid anhydride and having a content of the polybasic acid anhydride bonded thereto of 0.5–20% based on the weight of said cellulose material; and (d) an organic peroxide compound, wherein the weight ratio of (a) to (b) ranges from 30:70 to 80:20;

wherein the weight ratio of a total of (a)+(b) to (c) ranges from 30:70 to 70:30;

wherein (d) is present in an amount of 0.001 to 0.1% based on a total weight of (a)+(b)+(c); and wherein said raw material composition contains no cross-linking agent.

2. A polyolefin resin composition according to claim 1, wherein said polypropylene resin (a) has a melt a flow rate of 0.1 to 10 g/10 minutes at a temperature of 230° C. and a load of 2.16 kg and a melt tension of at least 5 g at 190° C.

3. A polyolefin resin composition according to claim 1, wherein said polyethylene resin (b) has a melt flow rate of 0.01 to 1.0 g/10 minutes at a temperature of 190° C. and a load of 2.16 kg and a melt tension of at least 15 g at 190° C.

4. A polyolefin resin composition according to claim 1, having a melt flow rate of 0.005 to 0.05 g/10 minutes at a temperature of 190° C. and a load of 2.16 kg.

5. A polyolefin resin composition according to claim 1, having a melt tension of at least 10 g at 190° C.

6. A polyolefin resin composition according to claim 1, wherein said cellulose material is at least one member selected from the group consisting of cellulose, modified cellulose, lignocellulose and modified lignocellulose.

7. A polyolefin resin composition according to claim 1, wherein said kneading of said raw material composition is performed at 150–200° C. for 0.5 to 30 minutes.

8. A raw material composition for forming an extrusion moldable polyolefin resin composition comprising:

(a) a polypropylene resin;

(b) a polyethylene resin;

(c) an esterified cellulose material obtained by esterifying a cellulose material with a polybasic acid anhydride and having a content of the polybasic acid anhydride bonded thereto of 0.5–20% based on the weight of said cellulose material; and (d) an organic peroxide compound, wherein the weight ratio of (a) to (b) ranges from 30:70 to 80:20;

wherein the weight ratio of a total of (a)+(b) to (c) ranges from 30:70 to 70:30;

wherein (d) is present in an amount of 0.001 to 0.1% based on a total weight of (a)+(b)+(c); and wherein said composition contains no cross-linking agent.

9. A method of preparing a polyolefin resin composition, comprising kneading a composition according to claim 8 at 150–200° C. for 0.5 to 30 minutes.

10. A method as claimed in claim 9, further comprising pelletizing said kneaded composition.

11. A molded article obtained by extruding a polyolefin resin composition according to claim 1.

12. The composition of claim 1 in the form of pellets suitable for use as a feed material for extrusion molding.

13. A polyolefin resin composition according to claim 1 wherein said raw material composition exhibits a melt flow rate of 0.005 to 0.05 g/10 minutes at a temperature of 190° C.

14. A polyolefin resin composition according to claim 8 wherein said raw material composition exhibits a melt flow rate of 0.005 to 0.05 g/10 minutes at a temperature of 190° C.

* * * * *